United States Patent
Ebuchi et al.

(10) Patent No.: US 7,016,423 B2
(45) Date of Patent: Mar. 21, 2006

(54) DRIVER CIRCUIT AND DATA COMMUNICATION DEVICE

(75) Inventors: Tsuyoshi Ebuchi, Osaka (JP); Takefumi Yoshikawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 864 days.

(21) Appl. No.: 10/058,904

(22) Filed: Jan. 30, 2002

(65) Prior Publication Data

US 2002/0106031 A1    Aug. 8, 2002

(30) Foreign Application Priority Data

Feb. 2, 2001    (JP) .............................. 2001-027501

(51) Int. Cl.
*H04L 25/00* (2006.01)
*G05F 1/10* (2006.01)

(52) U.S. Cl. ...................................... 375/257; 327/544

(58) Field of Classification Search ................ 375/257, 375/224; 327/544, 545, 68, 70, 76; 324/765
See application file for complete search history.

(56) References Cited

U.S. PATENT DOCUMENTS

| | | | | |
|---|---|---|---|---|
| 5,303,266 | A | | 4/1994 | Budin et al. ................. 375/257 |
| 6,119,193 | A | * | 9/2000 | Gomez et al. ............... 710/312 |
| 6,373,262 | B1 | * | 4/2002 | Herring et al. ............. 324/647 |
| 2003/0030461 | A1 | * | 2/2003 | Oberle et al. ................ 324/765 |

* cited by examiner

Primary Examiner—Khai Tran
(74) Attorney, Agent, or Firm—McDermott Will & Emery LLP

(57) ABSTRACT

The driver circuit of the present invention includes: a drive section for generating a differential signal according to an input signal and outputting the signal to an electric cable or an optical transceiver; and a control section receiving a selection signal based on which the drive section selects to drive the electric cable or the optical transceiver, an identification signal, and a data signal, for generating a signal based on the received signals and outputting the generated signal to the drive section. During a period indicated by the identification signal, the control section controls the drive section to put the output of the drive section in a high impedance state when the selection signal indicates selection of the electric cable, or output a predetermined differential signal, not putting the output in a high impedance state, when the selection signal indicates selection of the optical transceiver.

9 Claims, 15 Drawing Sheets

| TCE | TD | NTD |
|---|---|---|
| 0 | High-Z | High-Z |
| 1 | DIN | NDIN |

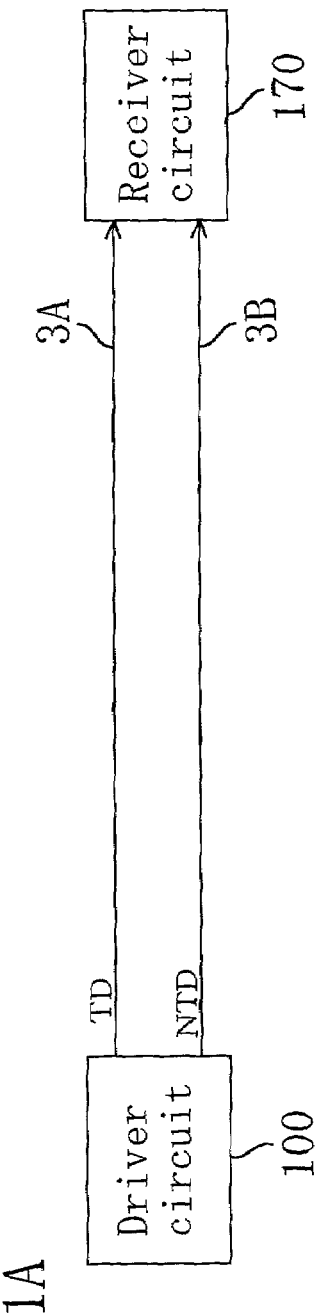
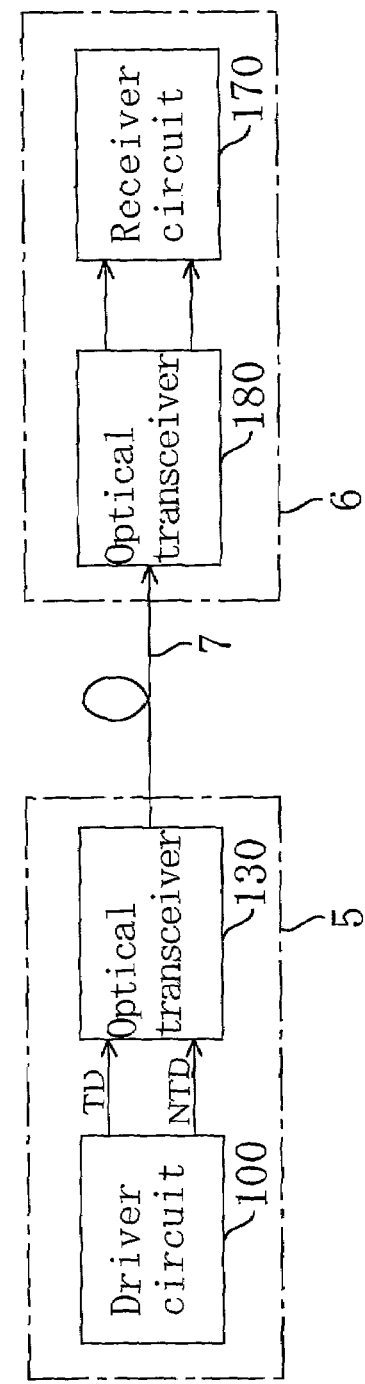
FIG. 1A
FIG. 1B

FIG. 4

| TCE | TD | NTD |
|-----|------|------|
| 0 | High-Z | High-Z |
| 1 | DIN | NDIN |

FIG. 6

| OPT | HIZ | TCE | DIN | NDIN |
|-----|-----|-----|-----|------|
| 0   | 0   | 1   | D   | ND   |
| 0   | 1   | 0   | D   | ND   |
| 1   | 0   | 1   | D   | ND   |
| 1   | 1   | 1   | 0   | 1    |

FIG. 11

| OPT | HIZ | STATE | TCE | DIN | NDIN |
|---|---|---|---|---|---|
| 0 | 0 | X | 1 | D | ND |
| 0 | 1 | X | 0 | D | ND |
| 1 | 0 | X | 1 | D | ND |
| 1 | 1 | 0 | 1 | 0 | 1 |
| 1 | 1 | 1 | 1 | 1 | 0 |

DRIVER CIRCUIT AND DATA COMMUNICATION DEVICE

BACKGROUND OF THE INVENTION

The present invention relates to a driver circuit and a data communication device used for a serial data transmission system.

As a standard for high-speed serial data transmission, IEEE P1394b (P1394b draft standard for a high performance serial bus) is known, which supports both an electric cable (metal cable) and an optical cable as a transmission route. According to this standard, once a speed negotiation cycle is terminated, a normal mode cycle for exchange of normal data is started.

In the case of communication via an electric cable, the following three states are used: the state where the potential of one signal line is high (hereinafter, referred to as "1") and the potential of the other signal line of a differential pair is low (hereinafter, referred to as "0"); the state where the potentials of the two signal lines are the opposite of those in the above state; and the state where the inter-line voltage of the differential pair is less than a predetermined value (that is, the state where the output of a driver circuit for driving the differential pair has a high impedance).

During the speed negotiation cycle, the data transmission speed is negotiated between communication devices connected with each other via the cable. During this cycle, the driver circuit for driving the cable repeats the period during which the output of the driver circuit is kept in the high impedance state and the period during which a 50 MHZ clock is transmitted by changing the potentials of the two signal lines. During the normal mode cycle, the driver circuit transmits normal 8B10B coded data by changing the potentials of the two signal lines to "1" or "0".

In other words, during the normal mode cycle, the driver circuit merely outputs "1" or "0", but during the speed negotiation cycle, it has periods during which the output is neither "1" nor "0" (that is, the output is put in the high impedance state).

In the case of communication via an optical cable, an optical transceiver for driving the optical cable must be provided, and the driver circuit must drive the optical transceiver. In most cases, an optical transceiver does not accept the output of the driver circuit to which the optical transceiver is connected when the output is in the high impedance state. Therefore, in the case of performing communication via an optical cable using a data transmission system conforming to a standard such as IEEE P1394b and having the possibility that the output of the driver circuit of the system may become the high impedance state, a trouble may possibly occur when the output of the driver circuit becomes the high impedance state if the system has a structure that an optical transceiver is merely connected to the conventional driver circuit. For this reason, it is conventionally impossible to share the driver circuit for both communication via an optical cable using an optical transceiver and communication via an electric cable.

SUMMARY OF THE INVENTION

An object of the present invention is providing a driver circuit usable for both communication via an optical cable and communication via an electric cable in a serial data transmission system.

The driver circuit of the present invention is constructed to output a differential signal according to an input data signal during a predetermined period indicated by an input identification signal, and be allowed to select between putting the output of the driver circuit in a high impedance state and outputting a predetermined differential signal not putting the output in a high impedance state during a period other than the predetermined period.

According to the present invention, whether the output of the driver circuit may become a high impedance state or not is selectable. This enables direct connection of the optical transceiver, which does not accept the input differential signal when the signal is minute, to the driver circuit. Therefore, it is possible to attain a driver circuit capable of driving both an optical transceiver and an electric cable.

Alternatively, the driver circuit of the present invention includes: a drive section for generating a differential signal according to an input signal and outputting the signal to an electric cable or an optical transceiver; and a control section receiving a selection signal based on which the drive section selects to drive the electric cable or the optical transceiver for controlling the output of the drive section, an identification signal, and a data signal, for generating a signal based on the received signals and outputting the generated signal to the drive section. During a predetermined period indicated by the identification signal, the control section controls the drive section to output the differential signal according to the data signal. During a period other than the predetermined period, the control section controls the drive section to put the output of the drive section in a high impedance state when the selection signal indicates selection of the electric cable, or output a predetermined differential signal, not putting the output in a high impedance state, when the selection signal indicates selection of the optical transceiver.

According to the present invention, when the selection signal indicates selection of the optical transceiver, the output of the drive section is not in the high impedance state, but the drive section outputs a predetermined differential signal. This enables direct connection of the optical transceiver, which does not accept the input differential signal when the signal is minute, to the driver circuit. On the contrary, when the selection signal indicates selection of the electric cable, the output of the drive section can be put in the high impedance state. Therefore, it is possible to attain a driver circuit capable of driving both an optical transceiver and an electric cable.

The driver circuit of the present invention also eliminates the necessity of switching the logic of a digital circuit for supplying data to the driver circuit between communication via the optical transceiver and communication via the electric cable. Therefore, since the digital circuit can be shared between communication via the optical transceiver and communication via the electric cable, the time for designing the circuits for transmission can be shortened.

In the driver circuit described above, preferably, a terminator is connected to the output of the drive section, and the magnitude of a voltage at the terminator is equal to or less than a predetermined value when the output of the drive section is in the high impedance state.

In the driver circuit described above, the selection signal is preferably fixed to a predetermined logic level. With this construction, the same circuit can be provided as a driver circuit dedicated to the optical transceiver or as a driver circuit dedicated to the electric cable.

In the driver circuit described above, preferably, the control section can designate the predetermined differential signal when the selection signal indicates selection of the optical transceiver. This enhances the general versatility of the driver circuit.

The driver circuit described above preferably further includes an externally readable/writable register, wherein a signal generated based on information stored in the register is used as the selection signal. With this construction, it is possible to select the optical transceiver or the electric cable to be used for data transmission by executing a software program and rewriting data in the register.

In the driver circuit described above, preferably, the differential signal output from the drive section is provided with a predetermined common mode voltage, and the driver circuit further comprises a judging section for comparing the common mode voltage with a predetermined reference voltage, and outputs the results to the control section as the selection signal. With this construction, it is possible to automatically judge which has been connected to the driver circuit, the electric cable or the optical transceiver, by using the output from the judging section as the selection signal.

The data communication device of the present invention includes: the driver circuit described above; a receiver circuit receiving a differential signal via an electric cable or an optical transceiver; and a judging section for comparing a common mode voltage of the differential signal input into the receiver circuit with a predetermined reference voltage, and outputs the results to the control section as the selection signal. With this construction, it is possible to automatically judge, from the signal input into the receiver circuit, which has been connected to the driver circuit, an electric cable or an optical transceiver, by using the output of the judging section as the selection signal.

BRIEF DESCRIPTION OF THE DRAWINGS

FIG. 1A is a block diagram of a serial data transmission system in an embodiment of the present invention, showing the case of using an electrical cable as a transmission route.

FIG. 1B is a block diagram of the serial data transmission system in the embodiment of the present invention, showing the case of using an optical cable as a transmission route.

FIG. 4 is an illustration of a truth table representing the relationship between input/output signals of the drive section in FIG. 2.

FIG. 6 is an illustration of a truth table representing the relationship between input/output signals of the control section in FIG. 2.

FIG. 11 is an illustration of a truth table representing the relationship between input/output signals of a control section in FIG. 10.

DESCRIPTION OF THE PREFERRED EMBODIMENTS

Figure 2:
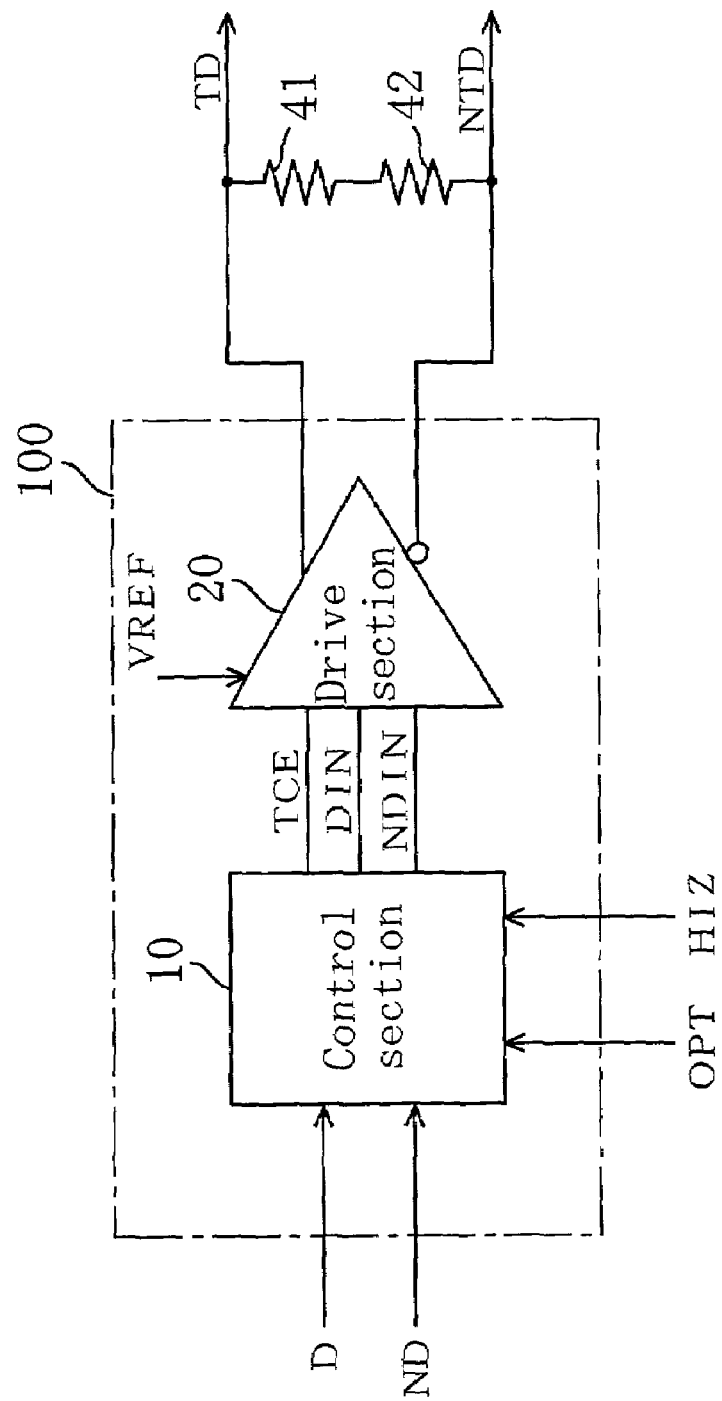
FIG. 2 is a block diagram of a driver circuit in the embodiment of the present invention.

Hereinafter, a preferred embodiment of the present invention will be described with reference to the accompanying drawings.

As used herein, a signal of which the potential level is logically low (LOW) is represented by "0", and a signal of which the potential level is logically high (HIGH) is represented by "1". As for a differential signal, one of the signal having a lower potential is represented by "0", and the other signal having a higher potential is represented by "1".

FIG. 1A is a block diagram of a serial transmission system in an embodiment of the present invention, showing the case of using an electric cable (metal cable) 3A, 3B as a transmission route. FIG. 1B is a block diagram of the serial transmission system in the embodiment of the present invention, showing the case of using an optical cable 7 as a transmission route. Note that terminators are omitted in FIGS. 1A and 1B.

Referring to FIG. 1A, a driver circuit 100 of a data communication device on the transmitter side is connected with a receiver circuit 170 of a data communication device on the receiver side via an electric cable 3A, 3B as a differential pair. The driver circuit 100 drives the electric cable 3A, 3B to transmit a signal to the receiver circuit 170.

Referring to FIG. 1B, a data communication device 5 on the transmitter side includes the driver circuit 100 and an optical transceiver 130. A data communication device 6 on the receiver side includes the receiver circuit 170 and an optical transceiver 180. The driver circuit 100 outputs a differential signal to the optical transceiver 130. The optical transceiver 130 converts the received electric signal to an optical signal and outputs the optical signal to the optical transceiver 180 via the optical cable 7. The optical transceiver 180 converts the received optical signal to a differential signal and outputs the differential signal to the receiver circuit 170.

FIG. 2 is a block diagram of the driver circuit 100 of this embodiment. The driver circuit 100 in FIG. 2 includes a control section 10 and a drive section 20. The driver circuit 100 is suitable for high-speed operation of outputting a small-amplitude differential current signal, and is connectable to both the optical transceiver 130 and the electric cable 3A, 3B.

The control section 10 receives data signals D and ND, an optical/electrical mode selection signal OPT, and an identification signal HIZ. The data signals D and ND are opposite in logic level to each other. The control section 10 generates signals corresponding to the received signals and outputs these signals for control of the drive section 20. The drive section 20, which outputs signals TD and NTD, feeds a current having a fixed magnitude to one signal line while drawing a current having substantially the same magnitude from the other signal line of the differential pair. The signals TD and NTD together form a differential signal.

Terminators 41 and 42 are connected in series between output nodes of the drive section 20 as shown in FIG. 2. The resistance values of the terminators 41 and 42 are set to be roughly the same. The drive section 20 feeds a current through the terminators 41 and 42, to thereby generate a predetermined voltage between the signal lines of the differential pair connected to the outputs thereof. The generated voltage is received by the receiver circuit 170 on the receiver side in the case of signal transmission via the electric cable 3A, 3B, or by the optical transceiver 130 on the transmitter side in the case of signal transmission via the optical cable 7.

The identification signal HIZ is a signal for identifying whether or not the transmission is in the midst of the period of keeping the output of the driver circuit in a high impedance (high-Z) state (hereinafter, this period is referred to as the high impedance period) in the case of transmission via the electric cable 3A, 3B. If the identification signal HIZ=1, this indicates that the transmission is in the midst of the high impedance period. If the identification signal HIZ=0, this indicates that it is in the midst of a period other than the high impedance period.

In the electrical mode for transmitting a signal via the electric cable 3A, 3B, the selection signal OPT is set at "0". In this case, when the identification signal HIZ=0, the input data signals D and ND are output as they are as signals TD and NTD. For example, when the data signals D and ND are "1" and "0", respectively, the driver circuit 100 outputs the differential signal where TD=1 and NTD=0. Since the data signals D and ND are opposite in level to each other, a current flows through the terminators 41 and 42, causing comparatively large voltages at the terminators 41 and 42.

When the identification signal HIZ=1, the driver circuit 100 puts the output thereof in the high impedance state, feeding no current. Therefore, the voltages at the terminators 41 and 42 are very small. In this embodiment, when the output of the driver circuit is in the high impedance state, the sum of the voltages at the terminators 41 and 42 is set at 20 mV or less.

In the optical mode for transmitting a signal via the optical cable 7, the selection signal OPT is set at "1". In this case, when the identification signal HIZ=0, the input data signals D and ND are output as they are as signals TD and NTD. When the identification signal HIZ=1, the driver circuit 100 does not put the output thereof in the high impedance state, but fixes the signals TD and NTD at "0" and "1", respectively.

As described above, the driver circuit 100 outputs the signals TD and NTD which have the same logic values as the data signals D and ND, respectively, when the identification signal HIZ=0. During the other period (that is, the high impedance period during which the identification signal HIZ=1), the driver circuit 100 can select between putting the output thereof in the high impedance state and not putting the output in the high impedance state but outputting a predetermined differential signal, by setting the logic level of the selection signal OPT.

Figure 3:
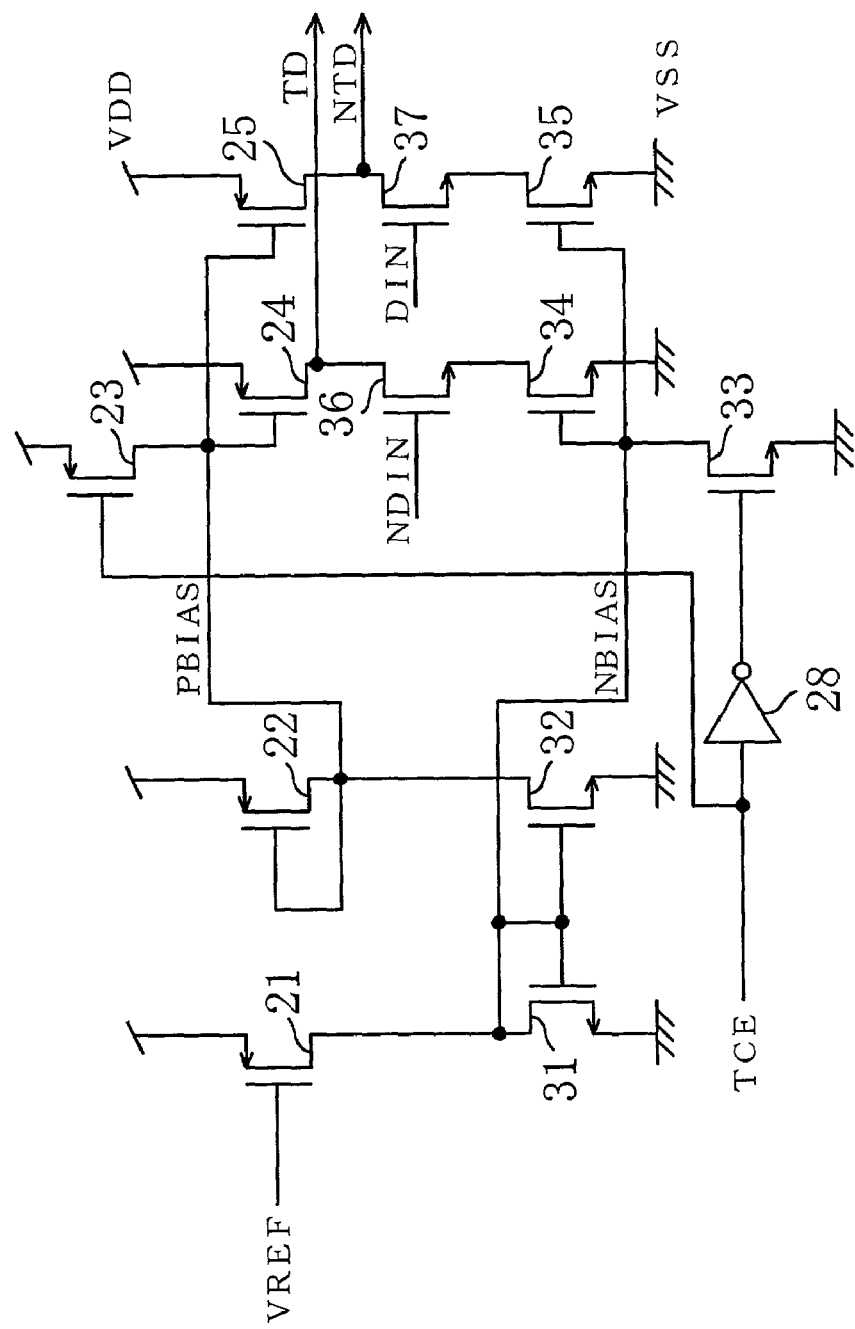
FIG. 3 is a circuit diagram of a drive section in FIG. 2.
Figure 4:
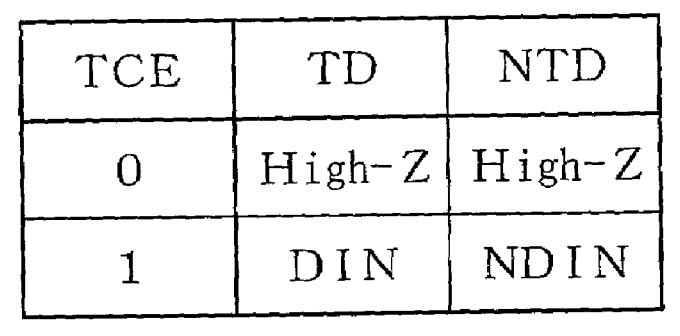

Hereinafter, the control section 10 and the drive section 20 will be described in detail. FIG. 3 is a circuit diagram of a construction of the drive section 20 in FIG. 2. The drive section 20 includes p-type metal oxide semiconductor (PMOS) transistors 21, 22, 23, 24, and 25, n-type MOS (NMOS) transistors 31, 32, 33, 34, 35, 36, and 37, and an inverter 28. FIG. 4 illustrates a truth table representing the relationship between input/output signals of the drive section 20 in FIG. 2.

A roughly constant reference bias voltage VREF is applied to the gate of the PMOS transistor 21. The PMOS transistors 21 and 22 and the NMOS transistors 31 and 32 constitute a current mirror circuit, where the drain voltage at the PMOS transistor 22 is obtained as a bias voltage PBIAS, and the drain voltage at the NMOS transistor 31 is obtained as a bias voltage NBIAS The bias voltage PBIAS is applied to the gates of the PMOS transistors 24 and 25, while the bias voltage NBIAS is applied to the gates of the NMOS transistors 34 and 35.

The supply voltage VDD is applied to the sources of the PMOS transistors 24 and 25, while the ground voltage VSS is applied to the sources of the NMOS transistors 34 and 35.

The signals TD and NTD are controlled by controlling ON/OFF of the NMOS transistors 36 and 37. The PMOS transistors 24 and 25 and the NMOS transistors 34 and 35 are used for feeding a constant current for the signals TD and NTD.

The supply voltage VDD and the bias voltage PBIAS are applied to the source and drain, respectively, of the PMOS transistor 23. The ground voltage VSS and the bias voltage NBIAS are applied to the source and drain, respectively, of the NMOS transistor 33. A driver output control signal TCE is input into the gate of the PMOS transistor 23 and the inverter 28. The output of the inverter 28 is input into the gate of the NMOS transistor 33.

The drive section 20 can switch the state of the output thereof between the normal state and the high impedance state by turning on/off the PMOS transistors 24 and 25 and the NMOS transistors 34 and 35 that operate as constant current sources.

When the control signal TCE=1, both the PMOS transistor 23 and the NMOS transistor 33 are OFF. In this case, the drive section 20 operates in the normal mode. The drive section 20 feeds a constant current controlled by the reference bias voltage VREF to the electric cable 3A, 3B after controlling the directions to correspond to the levels of signals DIN and NDIN.

Specifically, if the signal DIN=1 (NDIN=0), the NMOS transistor 36 is OFF and the NMOS transistor 37 is ON. Therefore, the drive section 20 outputs "1" as the signal TD, allowing a current to flow from the node at the signal TD to the node at the signal NTD. If the signal DIN=0 (NDIN=1), the NMOS transistor 36 is ON and the NMOS transistor 37 is OFF. Therefore, the drive section 20 outputs "0" as the signal TD, allowing a current to flow from the node at the signal NTD to the node at the signal TD.

When the control signal TCE=0, both the PMOS transistor 23 and the NMOS transistor 33 are ON. In this case, since the PMOS transistors 24 and 25 and the NMOS transistors 34 and 35 are turned OFF, the output of the drive section 20 is in the high impedance state. That is, the drive section 20 operates in the high impedance mode.

As described above, the drive section 20 outputs the signals TD and NTD which have the same logic values as the input signals DIN and NDIN, respectively, when the control signal TCE is "1", and puts the output in the high impedance state when the control signal TCE is "0".

Figure 5:
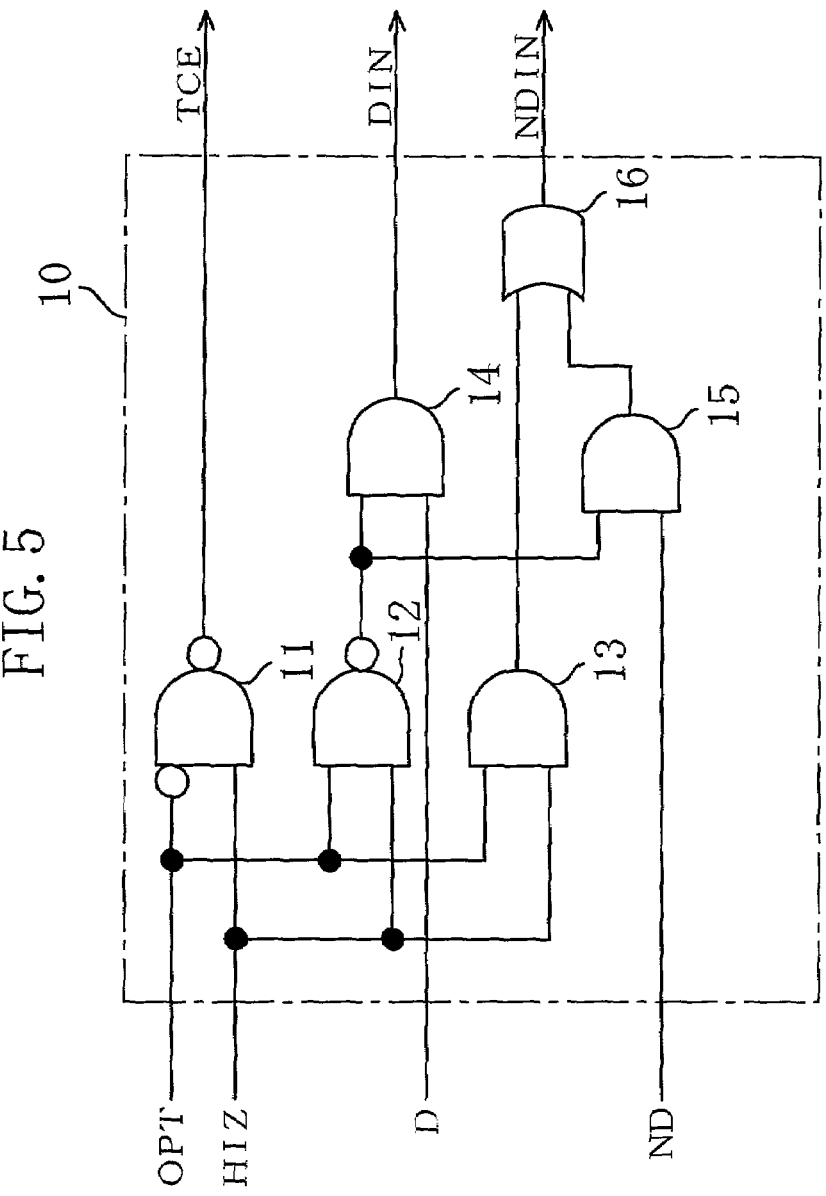
FIG. 5 is a circuit diagram of a control section in FIG. 2.

FIG. 5 is a circuit diagram of a construction of the control section 10 in FIG. 2. The control section 10 includes NAND gates 11 and 12, AND gates 13, 14, and 15, and an OR gate 16.

The control section 10 receives the data signals D and ND, the optical/electrical mode selection signal OPT, and the identification signal HIZ for identifying the high impedance period. The control section 10 generates the signals DIN and NDIN and the driver output control signal TCE according to the received signals and outputs the generated signals to the drive section 20.

FIG. 6 illustrates a truth table representing the relationship between the input/output signals of the control section 10 in FIG. 2. As shown in the truth table in FIG. 6, in the electrical mode (OPT=0), when the identification signal HIZ=1, the control section 10 sets the control signal TCE at "0", permitting the drive section 20 to operate in the high impedance mode. In this case, the output of the driver circuit 100, that is, the output of the drive section 20 is in the high impedance state. When the identification signal HIZ=0, the control section 10 sets the control signal TCE at "1", permitting the drive section 20 to operate in the normal mode. In this case, the control section 10 sets that the signal DIN=D and the signal NDIN=ND, where the logic values of the signals TD and NTD follow the logic values of the input data signals D and ND, respectively.

In the optical mode (OPT=1), when the identification signal HIZ=1, the control section 10 does not put the output of the driver circuit 100 in the high impedance state, but outputs the differential signal where signals TD is "0" and NTD is "1". In other words, the control section 10 sets the control signal TCE at "1" and simultaneously sets that the signal DIN=0 and the signal NDIN=1, to enable the drive section 20 to operate in the normal mode. When the identification signal HIZ=0, the control section 10 operates as in the electrical mode.

Figure 7:
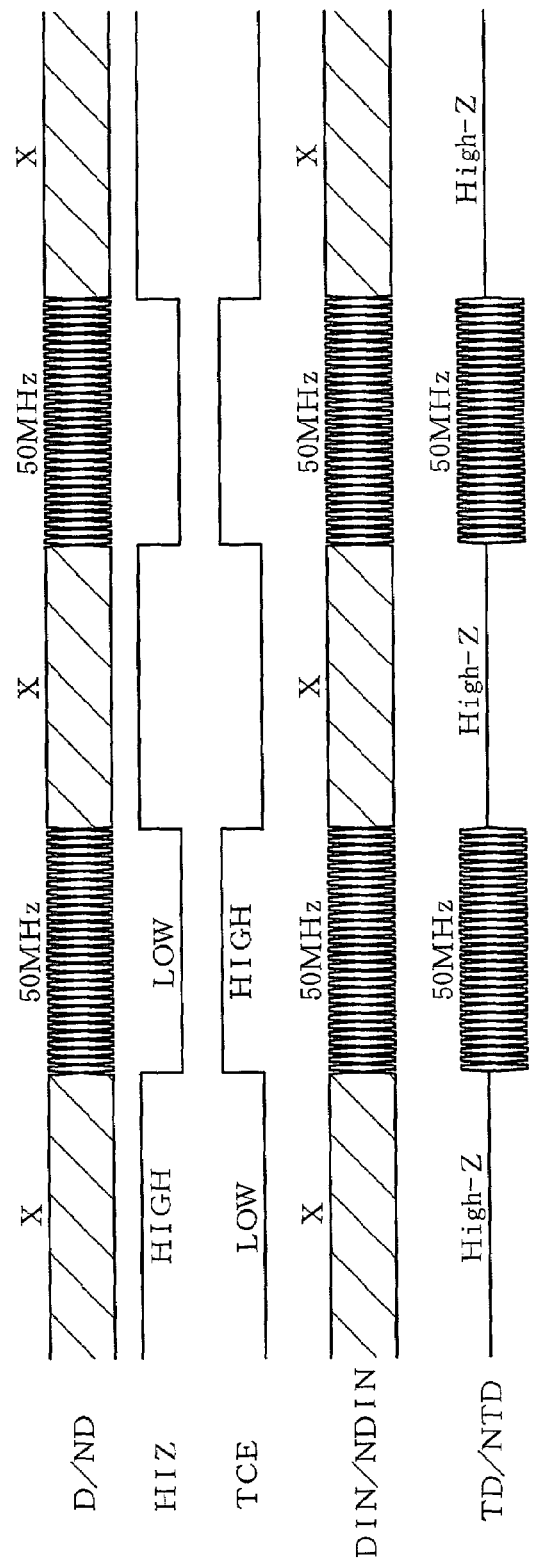
FIG. 7 is a graph showing waveforms in the driver circuit during the speed negotiation cycle in an electrical mode.
Figure 8:
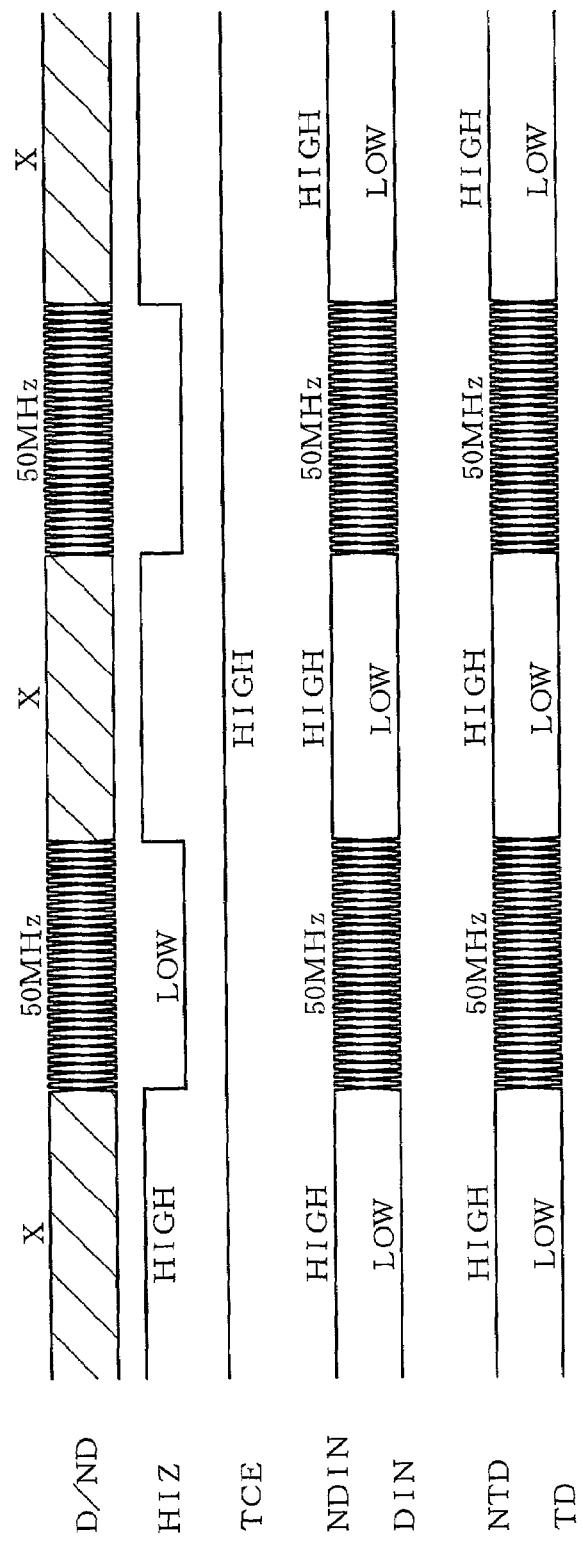
FIG. 8 is a graph showing waveforms in the driver circuit during the speed negotiation cycle in an optical mode.

FIG. 7 is a graph showing waveforms of the signals in the driver circuit 100 during the speed negotiation cycle in the electrical mode. FIG. 8 is a graph showing waveforms of the signals in the driver circuit 100 during the speed negotiation cycle in the optical mode. In FIGS. 7 and 8, "X" denotes the period in which the logic level of the input signal is arbitrary. Note that in the optical mode, the driver circuit 100 does not put the output thereof in the high impedance state during any other cycles, as during the speed negotiation cycle exemplified in FIG. 8.

In the above description, in the case of being connected to the optical transceiver (optical mode), the driver circuit 100 outputs the differential signal with the signal TD fixed at "0" when the identification signal HIZ=1 (the control section 10 sets that the signal DIN=0 and the signal NDIN=1). Alternatively, differential signal with the signal TD fixed at "1" may be output (the control section 10 may set that the signal DIN=1 and the signal NDIN=0) during this period.

As described above, the control section 10 receives the optical/electrical mode selection signal OPT, the identification signal HIZ, and the data signals D and ND, and generates signals for controlling the drive section 20, such as the driver output control signal TCE, to control the drive section 20. Specifically, the driver circuit 100 prevents the output thereof from becoming the high impedance state when it is connected to the optical transceiver (OPT=1) irrespective of the logic level of the identification signal HIZ. On the contrary, when the driver circuit 100 is connected to the electric cable (OPT=0), it can put the output thereof in the high impedance state according to the logic level of the identification signal HIZ. In this way, it is possible to provide a driver circuit usable for both the optical cable and the electric cable.

(First Modification)

Figure 9:
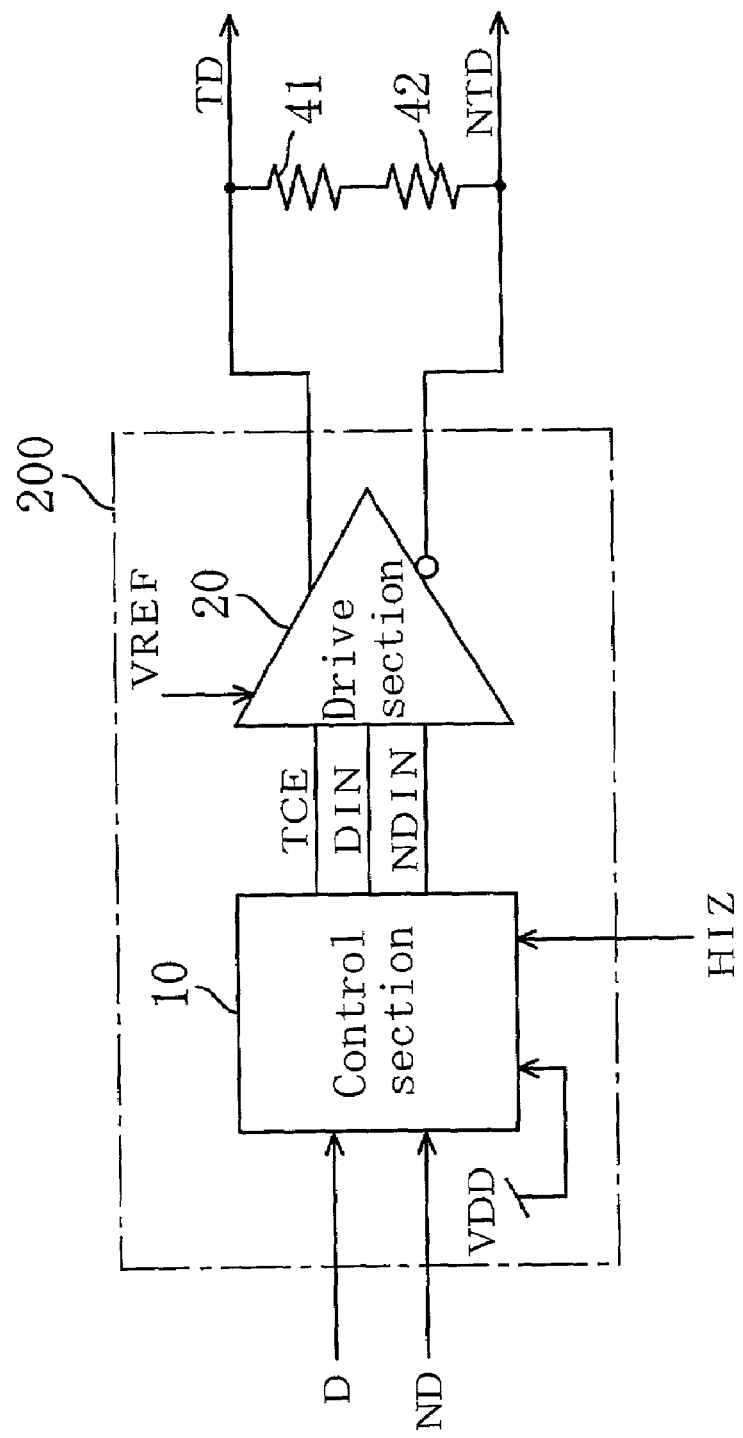
FIG. 9 is a block diagram of a driver circuit of a first modification of the present invention.

FIG. 9 is a block diagram of a driver circuit 200 of the first modification of the embodiment of the present invention. In the driver circuit in FIG. 9, the supply voltage VDD is applied as the optical/electrical mode selection signal OPT in the driver circuit 100 in FIG. 2. In this modification, the optical/electrical mode selection signal OPT is fixed to "1", and thus the driver circuit 200 is a circuit dedicated to the optical transceiver. Alternatively, the ground voltage VSS may be applied as the optical/electrical mode selection signal OPT. In this case, the optical/electrical mode selection signal OPT is fixed to "0", and thus the driver circuit 200 is a circuit dedicated to the electric cable.

Thus, in the first modification, the same circuit can be provided as a driver circuit dedicated to an optical transceiver or a driver circuit dedicated to an electric cable only by changing the voltage applied as the optical/electrical mode selection signal OPT. In addition, this eliminates the necessity of providing a pin for the optical/electrical mode selection signal OPT when the driver circuit is packaged.

(Second Modification)

Figure 10:
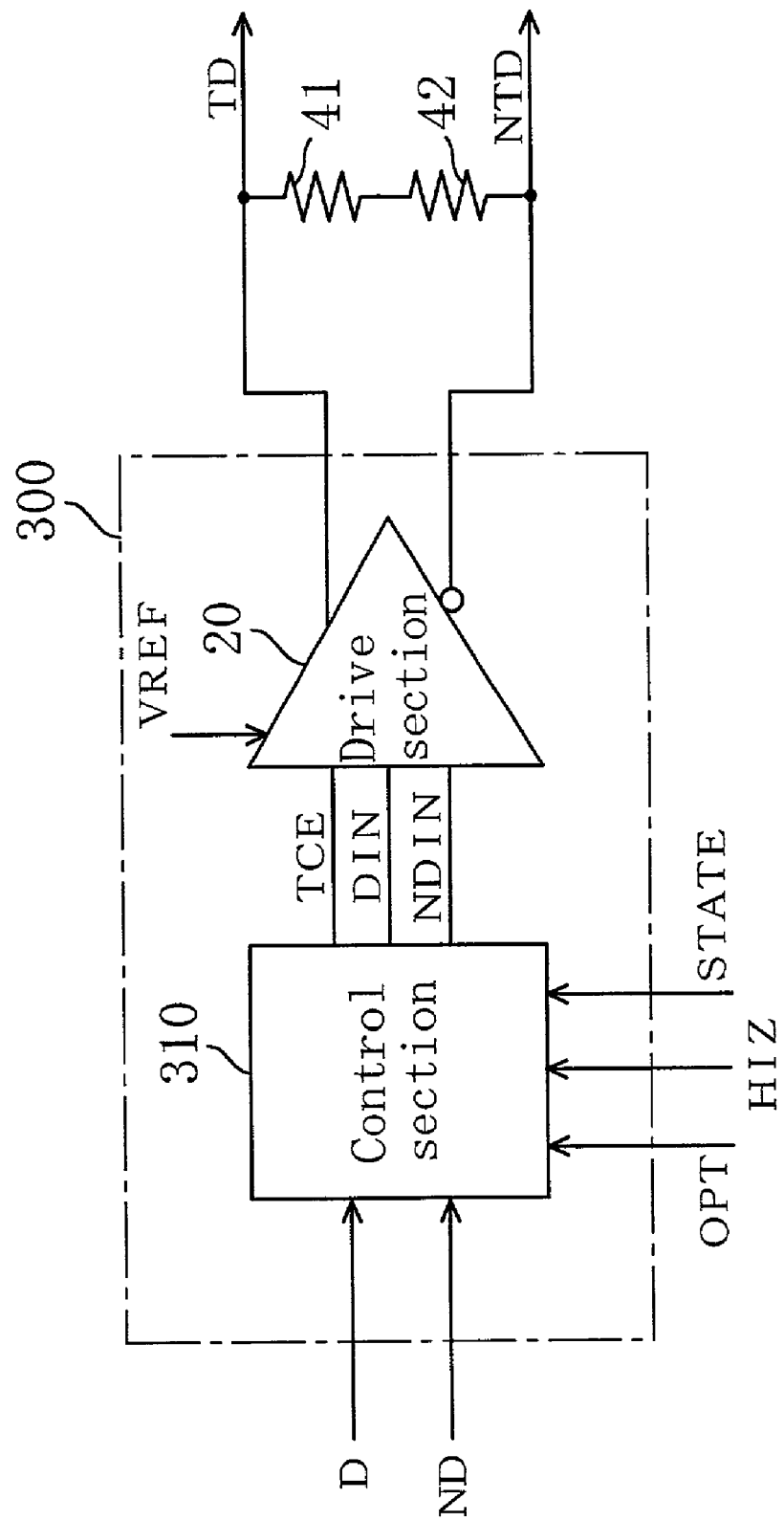
FIG. 10 is a block diagram of a driver circuit of a second modification of the present invention.

FIG. 10 is a block diagram of a driver circuit 300 of the second modification of the embodiment of the present invention. The driver circuit 300 in FIG. 10 includes a control section 310 in place of the control section 10 of the driver circuit 100 in FIG. 2. FIG. 11 illustrates a truth table representing the relationship between input/output signals in the control section 310 in FIG. 10. The control section 310 receives a signal STATE indicating the logic level of the signals DIN and NDIN to be output. In FIG. 11, "X" denotes that the logic level of the input signal is arbitrary. The control section 310 in FIG. 10 is obtained by only making a little change to the circuit of the control section 10 in FIG. 5, and thus will be easily constructed by those skilled in the art based on the truth table in FIG. 11. Therefore, the circuit diagram of the control section 310 is omitted.

As shown in FIG. 11, when the driver circuit 300 drives an optical transceiver (OPT=1) and the identification signal HIZ=1, the control section 310 outputs the signal DIN of "0" and the signal NDIN of "1" when the signal STATE=0, while it outputs the signal DIN of "1" and the signal NDIN of "0" when the signal STATE=1. Since the driver output control signal TCE=1, the signals TD and NTD output from the drive section 20 have the same logic values as the logic values of the signals DIN and NDIN, respectively. For the other cases, the control section 310 operates in the same manner as the control section 10 in FIG. 2.

Thus, in the second modification, in communication via an optical transceiver and an optical cable, the user can designate the differential signal to be output from the driver circuit during the high impedance period (during which the identification signal HIZ=1). With this ability of the user designating the differential signal output from the driver circuit depending on the situation, the general versatility of the driver circuit enhances.

(Third Modification)

Figure 12:
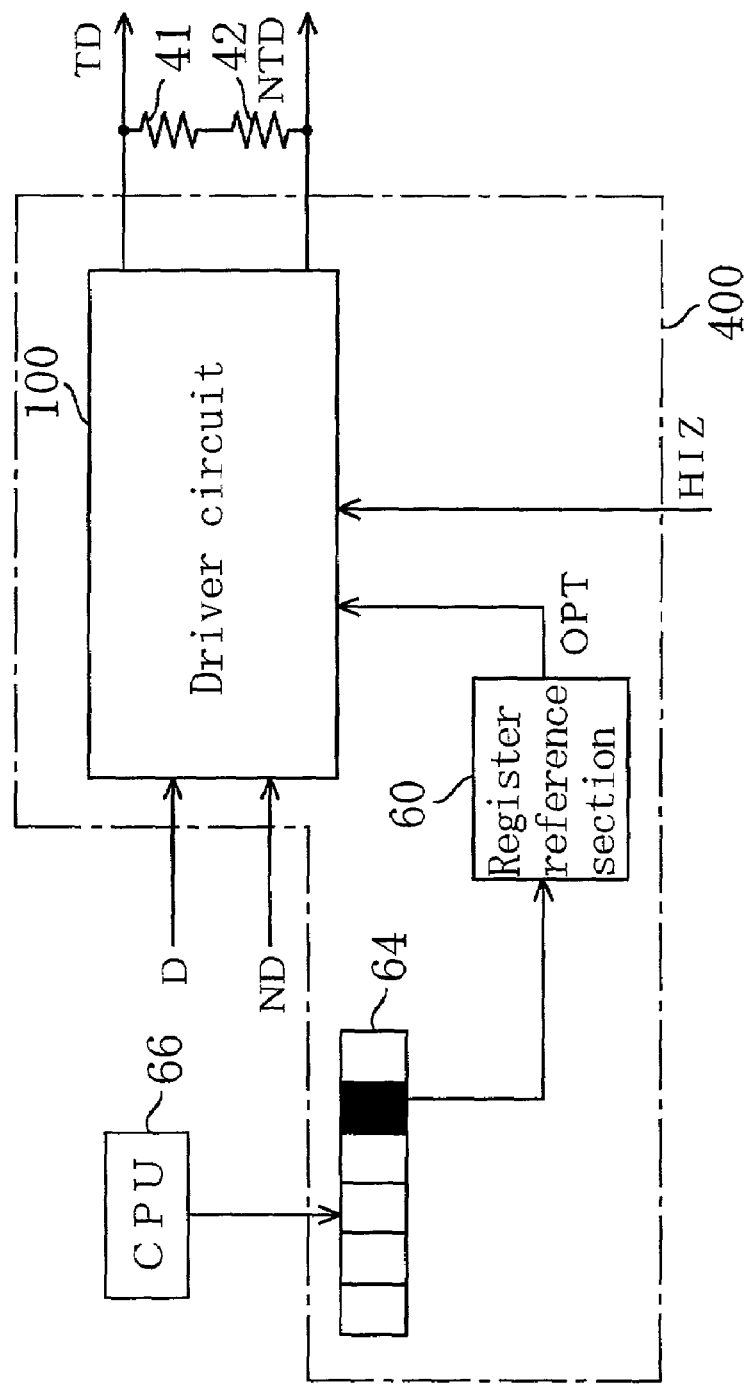
FIG. 12 is a block diagram of a driver circuit of a third modification of the present invention.

FIG. 12 is a block diagram of a driver circuit 400 of a third modification of the embodiment of the present invention. The driver circuit 400 in FIG. 12 includes a register 64 for storing information and a register reference section 60, in addition to the driver circuit 100 in FIG. 2. The register reference section 60 outputs a signal of a logic level corresponding to information represented by "0" or "1" stored in a specific bit of the register 64 to the driver circuit 100 as the optical/electrical mode selection signal OPT. The register 64 is readable/writable by an external CPU 66. The CPU 66 executes a software program, which designates an address of the register 64, and rewrites data in the register 64.

Thus, by describing in advance which should be used, the optical cable or the electric cable, in a software program, either the optical mode or the electrical mode is selected properly when the CPU 66 executes the software program, to enable communication in the selected mode.

In place of the CPU 66, the data in the register 64 may be rewritten by a DSP or the like operating according to a software program.

(Fourth Modification)

Figure 13:
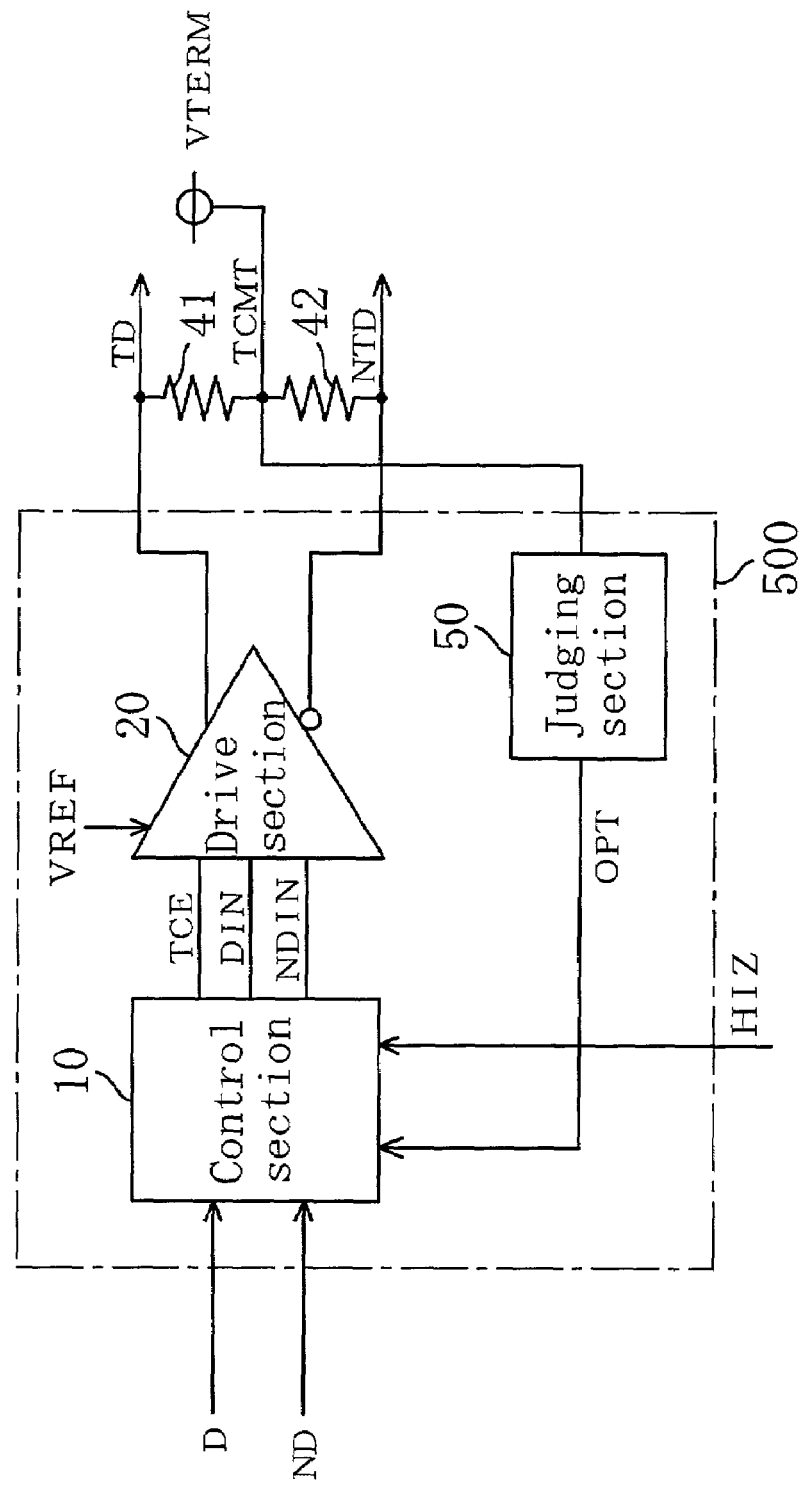
FIG. 13 is a block diagram of a driver circuit of a fourth modification of the present invention.

FIG. 13 is a block diagram of a driver circuit 500 of a fourth modification of the embodiment of the present invention. The driver circuit 500 in FIG. 13 includes a judging section 50 for judging the level of a common mode voltage TCMT of the differential signal on the transmitter side, in addition to the driver circuit 100 in FIG. 2. A terminal potential VTERM is applied as the common mode voltage to the differential signal output from the drive section 20.

Figure 14:
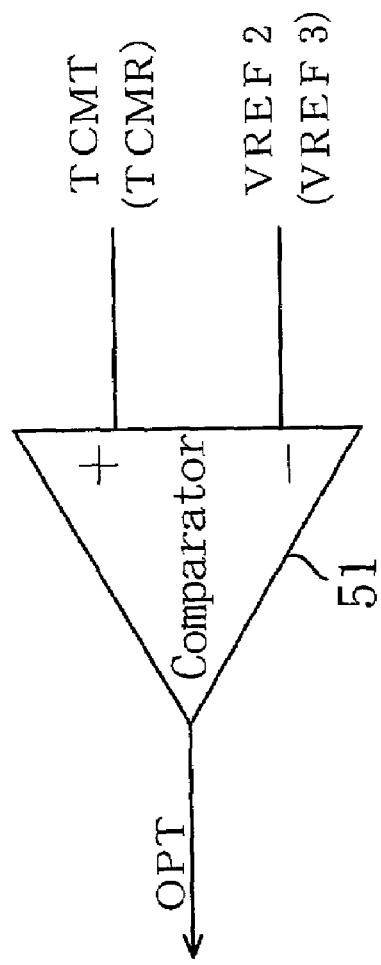
FIG. 14 is a circuit diagram of a judging section in FIG. 13.

FIG. 14 is a circuit diagram of the judging section 50 in FIG. 13. The judging section 50 includes a comparator 51, which compares the common mode voltage TCMT with a reference voltage VREF2, and outputs the results to the control section 10 as the optical/electrical mode selection signal OPT. The comparator 51 outputs "1" when the common mode voltage TCMT is greater than the reference voltage VREF2, and outputs "0" when the common mode voltage TCMT is smaller than the reference voltage VREF2. The common mode voltage TCMT is determined by the terminal potential VTERM applied to the node between the terminators 41 and 42. For example, the level of the terminal potential VTERM is made to follow the rule that VTERM>VREF2 when an optical cable is used and VTERM<VREF2 when an electric cable is used.

With the above rule, and by using the output of the comparator 51 as the optical/electrical mode selection signal OPT, it is possible to judge which has been connected to the driver circuit 500, an electric cable or an optical transceiver, and automatically set the optical/electrical mode selection signal OPT. This eliminates the necessity of manual switching work.

(Fifth Modification)

Figure 15:
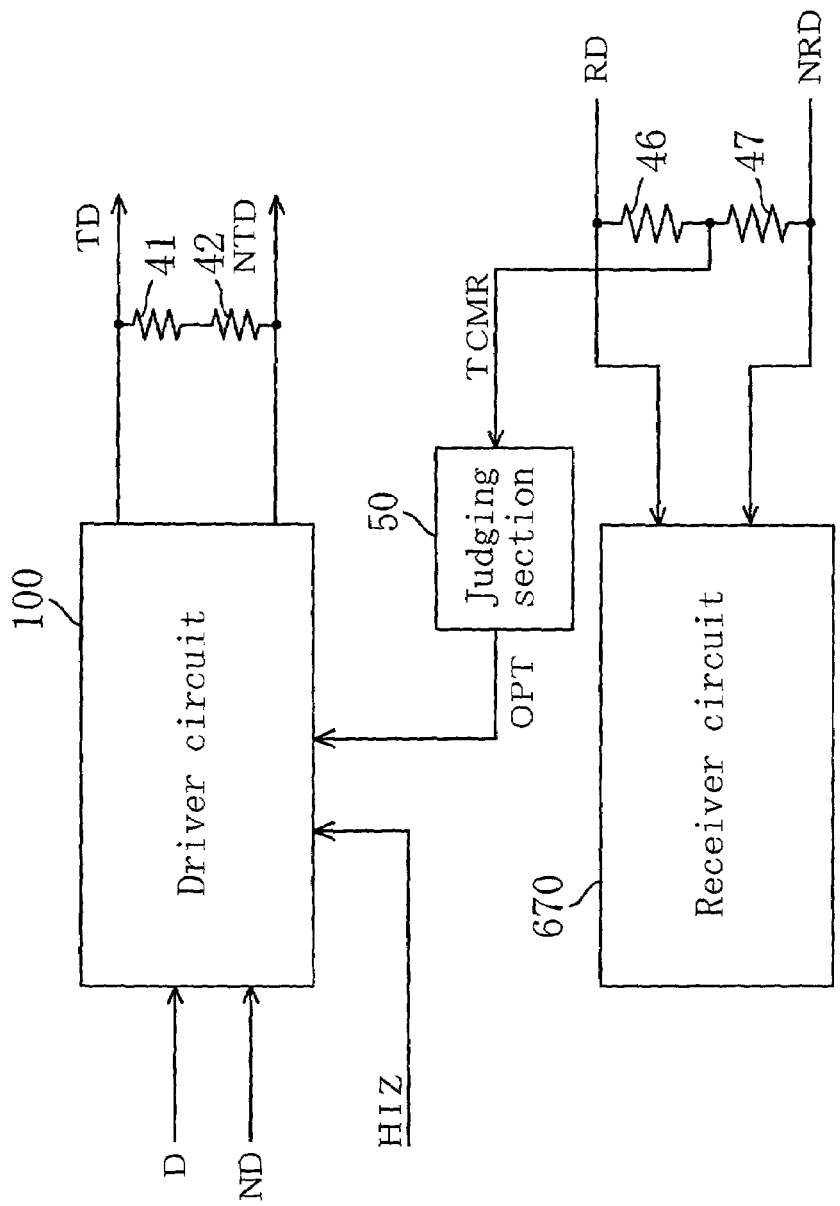
FIG. 15 is a block diagram of a data communication device on a fifth modification of the present invention.

FIG. 15 is a block diagram of a data communication device of a fifth modification of the embodiment of the present invention. The data communication device in FIG. 15 includes the driver circuit 100 in FIG. 2, a receiver circuit 670 receiving data from a sender via a differential pair, the judging section 50 for judging the magnitude of a common mode voltage TCMR of a differential signal (which is formed by signals RD and NRD) input into the receiver circuit 670, and terminators 46 and 47. To the receiver circuit 670, connected is an electric cable driven by a driver circuit or an optical transceiver on the receiver side, as in the receiver circuit 170 shown in FIGS. 1A and 1B. The resistance values of the terminators 46 and 47 are set to be roughly the same.

The judging section 50 includes the comparator 51 shown in FIG. 14, which compares a common mode voltage TCMR on the receiver side with a reference voltage VREF3, and judges which has been connected, an electric cable or an optical transceiver. Thus, the optical/electrical mode selection signal OPT can be set automatically.

When an electric cable is used, the electric cable is driven by a large-scale integration (LSI) possessed by a driver circuit on the transmitter side. The LSI is normally composed of a complementary metal oxide semiconductor (CMOS) circuit. Assume that the transmitter side does not apply a terminal potential to the electric cable. When an optical cable is used, the optical transceiver on the receiver side converts a received light signal to a differential signal and outputs the differential signal to the receiver circuit 670. Normally, the optical transceiver is composed of a bipolar transistor and receives the supply voltage of 5V. The output of the optical transceiver is a pseudo emitter coupled logic (PECL) signal, of which the common mode voltage is greater than the common mode voltage of a differential signal normally output from the LSI as the CMOS circuit. Alternatively, the optical transceiver may be constructed so that the common mode voltage of the output of the optical transceiver is invariably greater than the common mode voltage of the differential signal output from the LSI on the transmitter side.

Therefore, it is possible to judge which has been connected, an electric cable or an optical transceiver, by using the common mode voltage TCMR of the differential signal input into the receiver circuit 670. In this case, no rule such as that between the terminal potential VTERM and the reference voltage VREF2 described with reference to FIG. 14 is required. Therefore, the degree of freedom increases in the design of a system using this data communication device.

Thus, according to the present invention, it is possible to directly connect the optical transceiver, which does not accept the output of the driver circuit when the output is in the high impedance state, to the driver circuit. Therefore, one driver circuit can be used for both communication via an optical cable and communication via an electric cable. This realizes cost reduction of a data transmission system. In addition, this provides adaptability to a possible later media change (change of the transmission cable from an electric cable to an optical cable, for example), and thus increases flexibility of system design.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A driver circuit comprising:
a drive section for generating a differential signal according to an input signal and outputting the differential signal, or for placing the output of the drive section in a high impedance state; and
a control section for controlling the drive section to output the differential signal according to an input data signal during a first period indicated by an input identification signal and for controlling the drive section to place the output of the drive section in a high impedance state, or to output a predetermined differential signal and not place the output of the drive section in a high impedance state during a second period indicated by the identification signal.

2. A driver circuit comprising:
a drive section for generating a differential signal according to an input signal and outputting the signal to an electric cable or an optical transceiver; and
a control section receiving a selection signal based on which the drive section selects to drive the electric cable or the optical transceiver, an identification signal for controlling the output of the drive section, and a data signal, for generating a signal based on the received signals and outputting the generated signal to the drive section,
wherein, during a predetermined period indicated by the identification signal, the control section controls the drive section to output the differential signal according to the data signal, and during a period other than the predetermined period, the control section controls the drive section to put the output of the drive section in a high impedance state when the selection signal indicates selection of the electric cable, or output a predetermined differential signal, not putting the output in a high impedance state, when the selection signal indicates selection of the optical transceiver.

3. The driver circuit of claim 2, wherein a terminator is connected to the output of the drive section, and
the magnitude of a voltage at the terminator is equal to or less than a predetermined value when the output of the drive section is in the high impedance state.

4. The driver circuit of claim 2, wherein the selection signal is fixed to a predetermined logic level.

5. The driver circuit of claim 2, wherein the control section can designate the predetermined differential signal when the selection signal indicates selection of the optical transceiver.

6. The driver circuit of claim 2, further comprising an externally readable/writable register, wherein a signal generated based on information stored in the register is used as the selection signal.

7. The driver circuit of claim 2, wherein the differential signal output from the drive section is provided with a predetermined common mode voltage, and the driver circuit further comprises a judging section for comparing the common mode voltage with a predetermined reference voltage, and outputs the results to the control section as the selection signal.

8. A data communication device comprising:

the driver circuit of claim 2;

a receiver circuit receiving a differential signal via an electric cable or an optical transceiver; and a judging section for comparing a common mode voltage of the differential signal input into the receiver circuit with a predetermined reference voltage, and outputs the results to the control section as the selection signal.

9. The driver circuit of claim 1, wherein, during the second period, the control section controls the drive section to place the output of the drive section in a high impedance state when an input selection signal indicates that the drive section is to drive an electric cable, and to output the predetermined differential signal and not place the output of the drive section in a high impedance state when the selection signal indicates that the drive section is to drive an optical transceiver.

* * * * *